(12) United States Patent  (10) Patent No.: US 8,597,032 B2
Brodsky et al.  (45) Date of Patent: Dec. 3, 2013

(54) ELECTRONIC ASSEMBLIES MATING SYSTEM

(75) Inventors: William L. Brodsky, Binghamton, NY (US); Eric J. McKeever, Poughkeepsie, NY (US); John G. Torok, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 13/035,921

(22) Filed: Feb. 26, 2011

(65) Prior Publication Data

US 2012/0218698 A1  Aug. 30, 2012

(51) Int. Cl.
*H01R 12/00* (2006.01)
*H05K 1/00* (2006.01)

(52) U.S. Cl.
USPC ............................................. 439/65; 361/735

(58) Field of Classification Search
USPC ......................... 439/65, 61; 361/735, 796, 790
See application file for complete search history.

(56) References Cited

U.S. PATENT DOCUMENTS

| | | | |
|---|---|---|---|
| 4,479,140 A | 10/1984 | Horvath | 257/713 |
| 4,730,233 A | 3/1988 | Osterman | 361/693 |
| 4,825,337 A | 4/1989 | Karpman | 361/716 |
| 4,829,404 A | 5/1989 | Jensen | 361/749 |
| 4,902,236 A | 2/1990 | Hasircoglu | 439/77 |
| 5,544,017 A * | 8/1996 | Beilin et al. | 361/790 |
| 5,825,630 A * | 10/1998 | Taylor et al. | 361/790 |
| 5,848,906 A | 12/1998 | Glusker et al. | 439/157 |
| 6,049,467 A * | 4/2000 | Tamarkin et al. | 361/790 |
| 6,222,739 B1 * | 4/2001 | Bhakta et al. | 361/790 |
| 6,332,790 B1 | 12/2001 | Ishikawa et al. | 439/157 |
| 6,362,974 B1 * | 3/2002 | Lettang | 361/790 |
| 6,452,789 B1 | 9/2002 | Pallotti et al. | 361/679.02 |
| 6,731,514 B2 * | 5/2004 | Evans | 361/790 |
| 6,772,246 B2 | 8/2004 | Kim et al. | 710/62 |
| 6,822,874 B1 | 11/2004 | Marler | 361/752 |
| 7,108,530 B2 | 9/2006 | Kimura et al. | 439/218 |
| 7,180,751 B1 * | 2/2007 | Geschke et al. | 361/788 |
| 7,298,625 B1 * | 11/2007 | Wu et al. | 361/735 |
| 7,418,165 B2 | 8/2008 | Glebov et al. | 385/14 |
| 7,453,690 B2 | 11/2008 | Denny et al. | 361/679.33 |
| 7,457,128 B2 | 11/2008 | Peterson | 361/728 |
| 7,562,247 B2 | 7/2009 | Baker et al. | 714/2 |
| 7,596,539 B2 | 9/2009 | Chatterjee et al. | 706/47 |
| 7,643,307 B2 | 1/2010 | Bosco et al. | 361/757 |
| 7,690,927 B1 | 4/2010 | Kerrigan et al. | 439/74 |
| 7,821,792 B2 * | 10/2010 | Belady et al. | 361/735 |
| 8,108,731 B2 | 1/2012 | DeCusatis et al. | 714/37 |
| 8,310,835 B2 * | 11/2012 | Lin et al. | 361/760 |
| 8,328,571 B2 | 12/2012 | Mulfinger et al. | 439/260 |
| 8,351,204 B2 | 1/2013 | Yeo et al. | 361/695 |
| 2008/0313369 A1 | 12/2008 | Verdoorn et al. | 710/62 |

(Continued)

FOREIGN PATENT DOCUMENTS

WO  WO 2010050919 A1  5/2010

*Primary Examiner* — Hae Moon Hyeon
(74) *Attorney, Agent, or Firm* — Dennis Jung; Ido Tuchman

(57) ABSTRACT

A system to mate electronic assemblies includes a computer backplane, and a first electronic interconnect carried by the computer backplane configured to operationally mate with a first electronic assembly. The system also includes a second electronic interconnect carried by the computer backplane that is physically separate from the first electronic interconnect, the second electronic interconnect configured to operationally mate with a second electronic assembly where the first electronic assembly and the second electronic assembly mate with the computer backplane at substantially a same time.

15 Claims, 5 Drawing Sheets

(56) References Cited

U.S. PATENT DOCUMENTS

| | | | |
|---|---|---|---|
| 2009/0156031 A1 | 6/2009 | Staiger et al. | 439/151 |
| 2009/0327643 A1 | 12/2009 | Goodman et al. | 711/173 |
| 2011/0085309 A1 | 4/2011 | Yamada | 361/752 |
| 2011/0113160 A1 | 5/2011 | Duisenberg et al. | 710/8 |
| 2011/0205718 A1 | 8/2011 | Rosenberg et al. | 361/752 |
| 2012/0218698 A1 | 8/2012 | Brodsky et al. | 361/679.02 |
| 2012/0221761 A1 | 8/2012 | Brodsky et al. | 710/311 |
| 2012/0221762 A1 | 8/2012 | Brodsky et al. | 710/311 |

\* cited by examiner

ELECTRONIC ASSEMBLIES MATING SYSTEM

BACKGROUND OF THE INVENTION

Field of the Invention

The invention relates to the field of computer systems, and, more particularly, to electronic assemblies mating systems.

RELATED APPLICATIONS

This application contains subject matter related to the following co-pending U.S. patent application Ser. No. 13/035,924, filed Feb. 26, 2011 and titled "System to Operationally Connect Logic Nodes", U.S. patent application Ser. No. 13/035,925, filed Feb. 26, 2011 and titled "Shared System to Operationally Connect Logic Nodes", and U.S. patent application Ser. No. 13/035,926, filed Feb. 26, 2011 and titled "Logic Node Connection System", the entire subject matters of which are incorporated herein by reference in their entirety. The aforementioned applications are assigned to the same assignee as this application, International Business Machines Corporation of Armonk, N.Y.

DESCRIPTION OF BACKGROUND

Recent developments of rack-mounted servers generally reside in two specific categories. The first of these are stand-alone servers which reside in a common rack, but do not communicate or share computing resources such as processor, memory, and/or input/output utilization, but share mechanical support, power, and/or cooling infrastructure.

The second category is associated with integrated servers, to which physical nodes not only utilize common mechanical support, power, and/or cooling infrastructure, but also are required to share computing resources. In this case, these physical nodes, e.g. books, drawers, blades, logic nodes, and/or the like, are required to share general communications such as common system-level clocking, service support processing function, and/or the like as well as specific inter-node computing functions via a fabric or parallel communication bus structure.

SUMMARY OF THE INVENTION

According to one embodiment of the invention, a system to mate electronic assemblies may include a computer backplane, and a first electronic interconnect carried by the computer backplane configured to operationally mate with a first electronic assembly. The system may also include a second electronic interconnect carried by the computer backplane that is physically separate from the first electronic interconnect, the second electronic interconnect configured to operationally mate with a second electronic assembly where the first electronic assembly and the second electronic assembly mate with the computer backplane at substantially a same time.

The first electronic interconnect and the second electronic interconnect may be positioned on the computer backplane based upon the respective positions of the first electronic assembly and the second electronic assembly. The first electronic interconnect may comprise a third electronic assembly, the second electronic interconnect may comprise a fourth electronic assembly, and the first electronic assembly and the second electronic assembly are carried by a circuit board.

The system may also include at least a third electronic interconnect carried by the computer backplane and configured to operationally mate with at least a respective fifth electronic assembly, where the at least third electronic interconnect may comprise at least a sixth electronic assembly, and the fifth electronic assembly may be carried by the circuit board. The third electronic assembly and the fourth electronic assembly may comprise power supplies and the computer backplane positions each power supply close to a respective first and second electronic assembly to reduce distributions losses from either power supply to the respective electronic assembly. The first electronic interconnect and the second electronic interconnect may be in parallel and not in series.

The computer sub-assembly backplane may have a reduced profile due to the first electronic interconnect and the second electronic interconnect being distributed plane. The reduced profile of the backplane may increase the airflow around an electronic assembly the backplane mates to. The first electronic interconnect and the second electronic interconnect may use mechanical tracks to align with the first electronic assembly and second electronic assembly respectively.

In an embodiment, the system may comprise a computer backplane, and a first electronic interconnect carried by the computer backplane configured to operationally mate with a first electronic assembly. The system may also include a second electronic interconnect carried by the computer backplane that is physically separate from the first electronic interconnect, the second electronic interconnect configured to operationally mate with a second electronic assembly where the first electronic assembly and the second electronic assembly mate with the computer backplane at substantially a same time. The first electronic interconnect and the second electronic interconnect may be positioned on the computer backplane based upon the respective positions of the first electronic assembly and the second electronic assembly, and the first electronic interconnect and the second electronic interconnect are in parallel and not in series.

In an embodiment, the system may include a computer backplane, and a first electronic interconnect carried by the computer backplane configured to operationally mate with a first electronic assembly. The system may also include a second electronic interconnect carried by the computer backplane that is physically separate from the first electronic interconnect to reduce the computer backplane's profile due to the first electronic interconnect and the second electronic interconnect being distributed along the computer backplane and the reduced profile of the backplane increases the airflow around an electronic assembly the backplane mates to. The second electronic interconnect may be configured to operationally mate with a second electronic assembly where the first electronic assembly and the second electronic assembly mate with the computer backplane at substantially a same time.

DETAILED DESCRIPTION OF THE INVENTION

Figure 1:
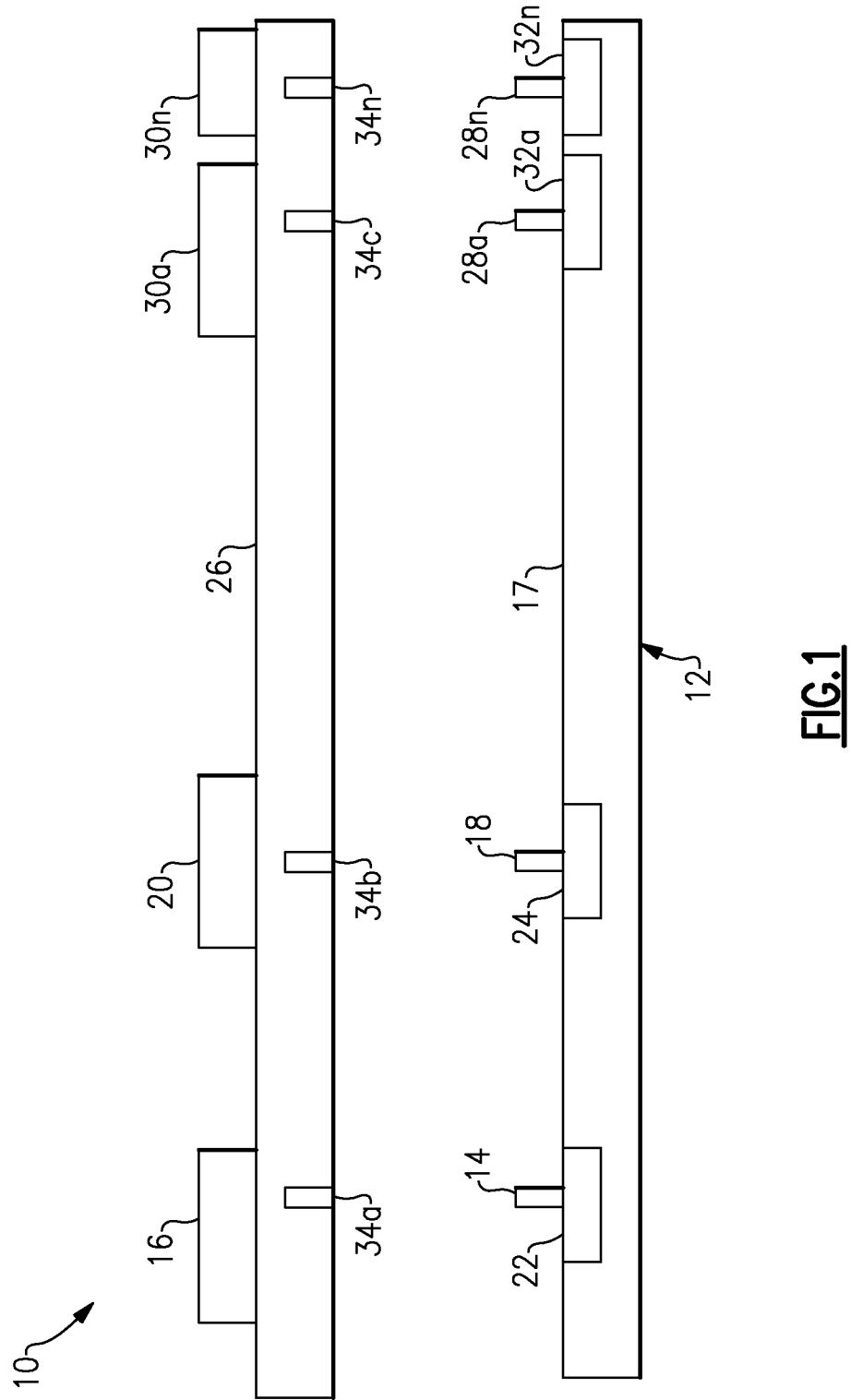
FIG. 1 is a cross-sectional view of a system to mate electronic assemblies in accordance with the invention.
Figure 2:
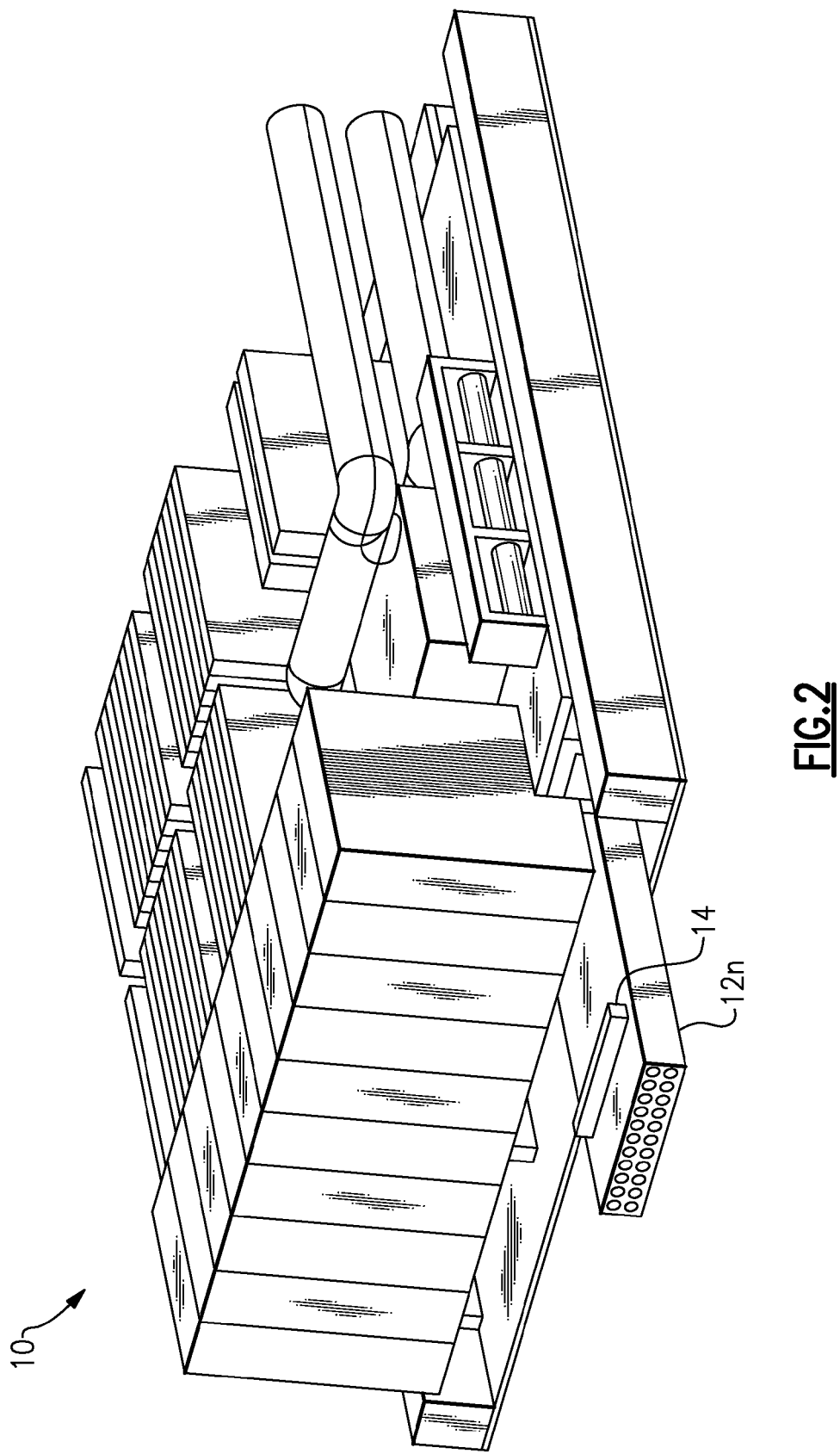
FIG. 2 is a front isometric view of the system of FIG. 1.
Figure 3:
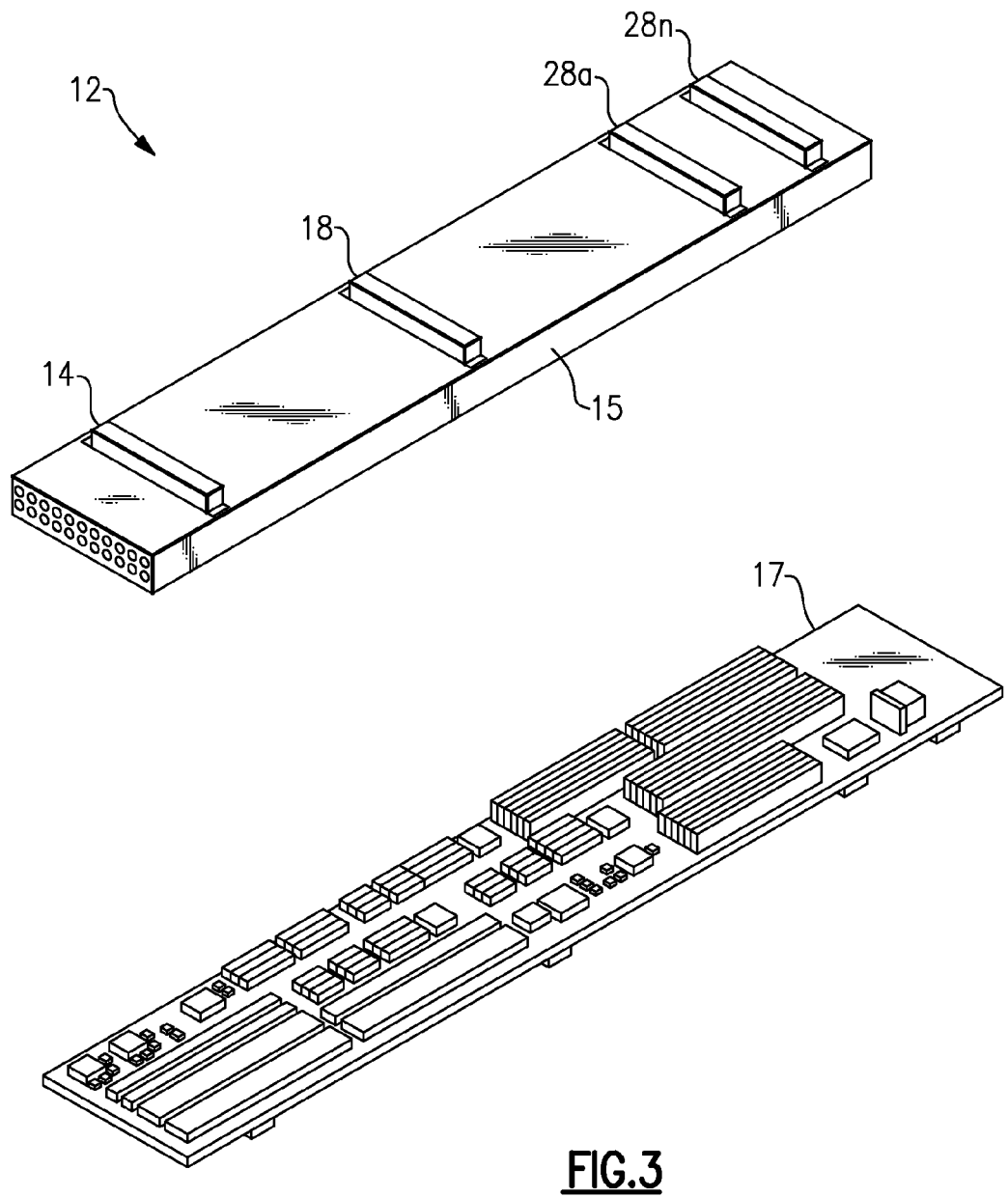
FIG. 3 is a top and bottom isometric views of the computer backplane and associated cover found in the system of FIG. 1.

The invention will now be described more fully hereinafter with reference to the accompanying drawings, in which preferred embodiments of the invention are shown. Like numbers refer to like elements throughout, like numbers with letter suffixes are used to identify similar parts in a single embodiment, and letter suffix lower case n is a variable that indicates an unlimited number of similar elements.

With reference now to FIGS. 1-4b, a system 10 to mate electronic assemblies is initially described. In an embodiment, system 10 includes a computer backplane 12a-12n, which may include a cover 15 and backplane circuit board 17. The system 10 also includes a first electronic interconnect 14 carried by the computer backplane configured to operationally mate with a first electronic assembly 16. The electronic assembly 16, like all other electronic assemblies in this disclosure, comprises memory cards, computer modules, input/output fanout cards, mini boards, and/or the like.

The system 10 also includes a second electronic interconnect 18 carried by the computer backplane 12a-12n that is physically separate from the first electronic interconnect 14, which means the first electronic interconnect and the second electronic interconnect do not share the same housing, wiring, and/or the like at the point each contacts a respective electronic assembly, for example. The second electronic interconnect 18 is configured to operationally mate with a second electronic assembly 20, which means the second electronic interconnect 18 and the second electronic assembly 20 relay data, power, and/or the like across each other, for instance. Further, the first electronic interconnect 14 and the second electronic assembly 20 mate with the computer backplane 12a-12n at substantially the same time.

In an embodiment, the first electronic interconnect 14 and the second electronic interconnect 18 are positioned on the computer backplane 12a-12n based upon the respective positions of the first electronic assembly 16 and the second electronic assembly 20. In another embodiment, the first electronic interconnect 14 comprises a third electronic assembly 22, the second electronic interconnect 18 comprises a fourth electronic assembly 24, and the first electronic assembly 16 and the second electronic assembly 20 are carried by a circuit board 26.

In an embodiment, the system 10 also includes at least a third electronic interconnect 28a-28n carried by the computer backplane 12a-12n and configured to operationally mate with at least a respective fifth electronic assembly 30a-30n, where the at least third electronic interconnect comprises at least a sixth electronic assembly 32a-32n, and the fifth electronic assembly is carried by the circuit board 26. In another embodiment, the third electronic assembly 22 and the forth electronic assembly 24 comprise power supplies and the computer backplane 12a-12n positions each power supply close to a respective first and second electronic assembly 16 and 20 to reduce distributions losses from either power supply to the respective electronic assembly. In another embodiment, the first electronic interconnect 14 and the second electronic interconnect 18 are in parallel and not in series.

In an embodiment, the computer sub-assembly backplane 12a-12n has a reduced profile due to the first electronic interconnect 14 and the second electronic interconnect 18 being distributed along the assembly which mates to a system computer back-plane. The reduced profile of the backplane 12a-12n increases the airflow around an electronic assembly 16, 20, and 30a-30n the backplane mates to. In another embodiment, the first electronic interconnect 14 and the second electronic interconnect 18 use mechanical tracks to align with the first electronic assembly 16 and second electronic assembly 20 respectively. In another embodiment, there is no blind swapping mechanism because cards align to electronic interconnect 14, 18, and/or 28a-28n via the mechanical tracks.

In an embodiment, the system 10 comprises a computer backplane 12a-12n, and a first electronic interconnect 14 carried by the computer backplane configured to operationally mate with a first electronic assembly 16. The system 10 also includes a second electronic interconnect 18 carried by the computer backplane 12a-12n that is physically separate from the first electronic interconnect 14, the second electronic interconnect 18 configured to operationally mate with a second electronic assembly 20 where the first electronic assembly 16 and the second electronic assembly 20 mate with the computer backplane at substantially the same time. The first electronic interconnect 14 and the second electronic interconnect 18 are positioned on the computer backplane 12a-12n based upon the respective positions of the first electronic assembly 16 and the second electronic assembly 20, and the first electronic interconnect and the second electronic interconnect 18 are in parallel and not in series.

In an embodiment, the system 10 includes a computer backplane 12a-12n, and a first electronic interconnect 14 carried by the computer backplane and configured to operationally mate with an electronic assembly 16. The system 10 also includes a second electronic interconnect 18 carried by the computer backplane 12a-12n that is physically separate from the first electronic interconnect 14 to reduce the computer backplane's profile due to the first electronic interconnect and the second electronic interconnect being distributed along the computer backplane and the reduced profile of the backplane increases the airflow around an electronic assembly 16 the backplane mates to. The second electronic interconnect 18 is configured to operationally mate with a second electronic assembly 20 where the first electronic assembly 16 and the second electronic assembly mate with the computer backplane 12a-12n at substantially the same time.

In view of the foregoing, the system 10 aids in mating electronic assemblies such as 16, 20, 22, 24, 30a-30n, and/or 32a-32n. In addition, the system 10 removes more heat from the mated electronic assemblies than current electronic mating assemblies.

Figure 4A:
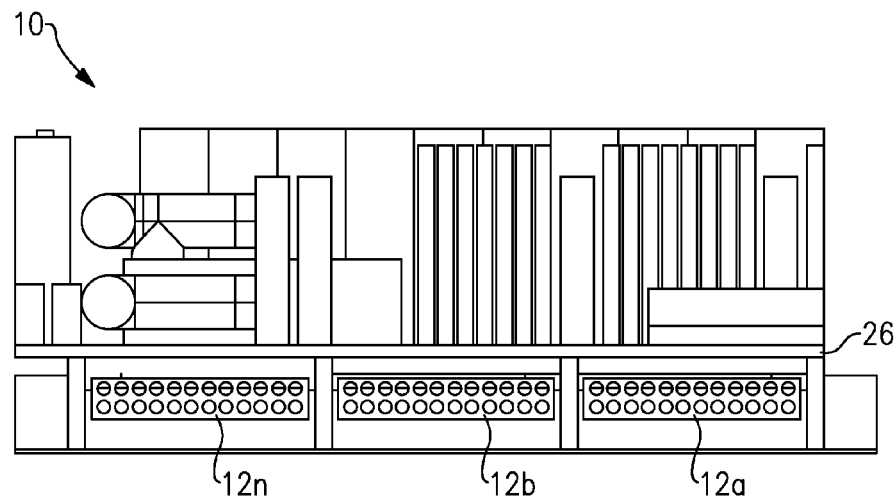
FIG. 4a is a rear view of the system of FIG. 1.
Figure 4B:
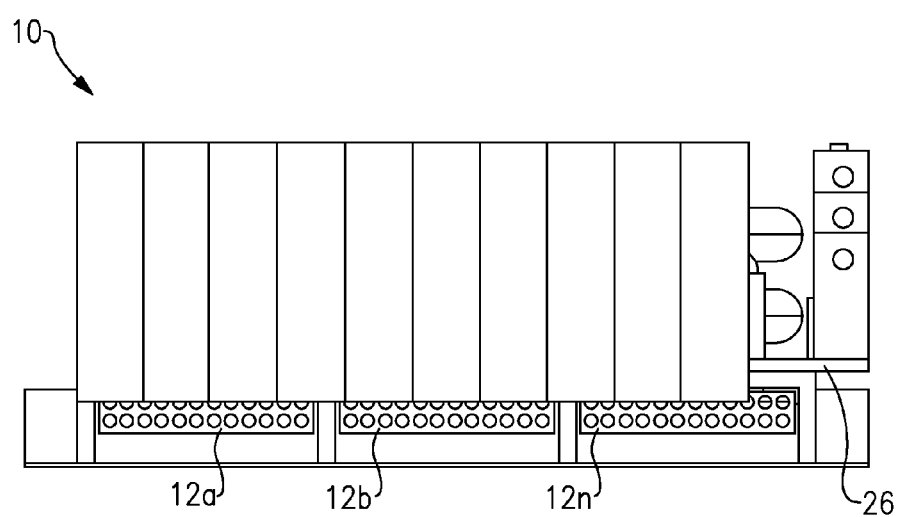
FIG. 4b is a front view of the system of FIG. 1.

System 10 provides system-level integration facilitated thru the use of multiple, parallel electronic interconnects 14, 18, and/or 28a-28n having co-docking features. In one embodiment, the computer backplane 12a-12n installs into front of server drawer as illustrated in FIG. 4b.

In an embodiment, the computer backplane 12a-12n will slide under I/O cards and rise up toward the circuit board 26 and four right angle electronic connectors 34a-34n on bottom of the circuit board will mate simultaneously with 4 right angle electronic interconnects 14, 18, and/or 28a-28n on top of computer backplane.

Figure 5:
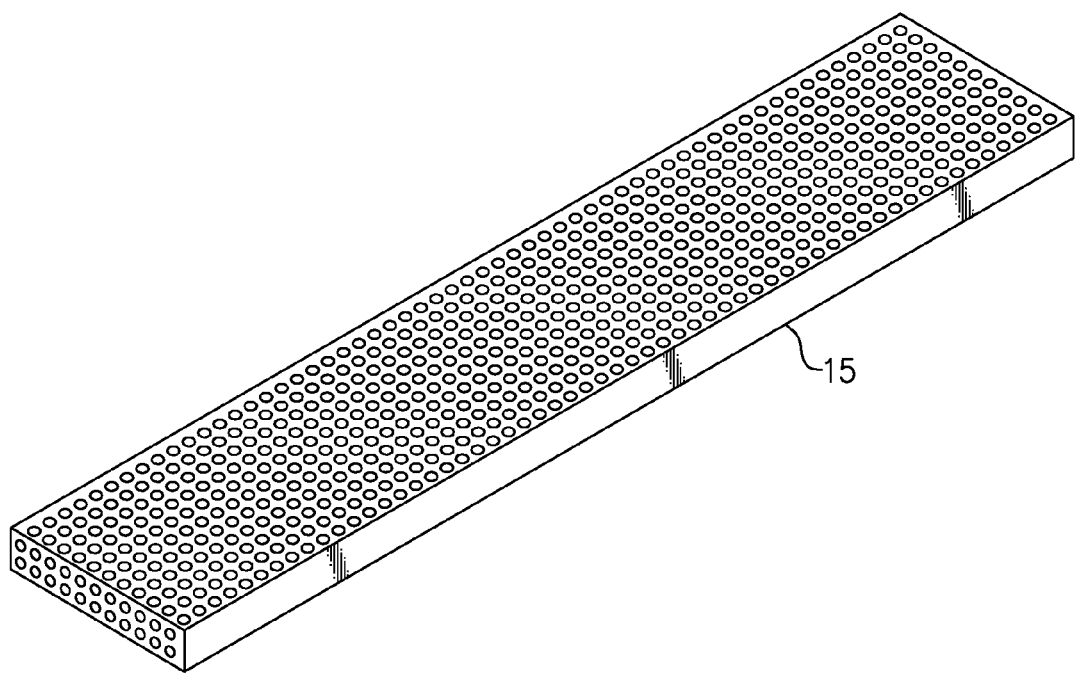
FIG. 5 is a bottom-side view of the computer backplane cover of FIG. 3.

In an embodiment, the system 10 provides airflow from front to rear. In another embodiment, the computer backplane 12a-12n includes a cover with perforations on front, bottom, and rear as illustrated in FIG. 5.

In an embodiment, the unused volume in node assembly is the clearance between the computer backplane 12a-12n cover and height of mated connectors plus a sliding clearance allowance. This space can subsequently be used as air plenum for air flow.

In an embodiment, multiple connector positions provides distributed low voltage current distribution into processor circuit board 26 to reduce voltage drop and I²R heating. In another embodiment, power distribution in computer backplane 12a-12n is higher voltage so lower current.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system comprising:
    a computer backplane;
    a first electronic interconnect carried by the computer backplane configured to operationally mate with a first electronic assembly; and
    a second electronic interconnect carried by the computer backplane that is physically separate from the first electronic interconnect, the second electronic interconnect configured to operationally mate with a second electronic assembly, and where the first electronic assembly and the second electronic assembly mate with the computer backplane at substantially a same time;
    a circuit board carrying the first electronic assembly and the second electronic assembly;
    wherein the first electronic interconnect comprises a third electronic assembly;
    wherein the second electronic interconnect comprises a fourth electronic assembly; and
    wherein the third electronic assembly and the forth electronic assembly comprise power supplies and the computer backplane positions each power supply close to the first electronic assembly and the second electronic assembly to reduce distributions losses from either power supply to the first electronic assembly and the second electronic assembly.

2. The system of claim 1 wherein the first electronic interconnect and the second electronic interconnect are positioned on the computer backplane based upon the respective positions of the first electronic assembly and the second electronic assembly.

3. The system of claim 1 further comprising at least a third electronic interconnect carried by the computer backplane and configured to operationally mate with at least a respective fifth electronic assembly, the at least third electronic interconnect comprises at least a sixth electronic assembly, and the fifth electronic assembly is carried by the circuit board.

4. The system of claim 1 wherein the first electronic interconnect and the second electronic interconnect are in parallel and not in series.

5. The system of claim 1 wherein the computer backplane has a reduced profile due to the first electronic interconnect and the second electronic interconnect being distributed along the first electronic assembly and the second electronic assembly which mates to a system computer backplane.

6. The system of claim 5 wherein the reduced profile of the computer backplane increases the airflow around the first electronic assembly and the second electronic assembly the computer backplane mates to.

7. The system of claim 1 wherein the first electronic interconnect and the second electronic interconnect use mechanical tracks to align with the first electronic assembly and second electronic assembly respectively.

8. A system comprising:
    a computer backplane;
    a first electronic interconnect carried by the computer backplane configured to operationally mate with a first electronic assembly; and
    a second electronic interconnect carried by the computer backplane that is physically separate from the first electronic interconnect, the second electronic interconnect configured to operationally mate with a second electronic assembly, and where the first electronic assembly and the second electronic assembly mate with the computer backplane at substantially a same time, the first electronic interconnect and the second electronic interconnect are positioned on the computer backplane based upon the respective positions of the first electronic assembly and the second electronic assembly, and the first electronic interconnect and the second electronic interconnect are in parallel and not in series;
    a circuit board carrying the first electronic assembly and the second electronic assembly;
    wherein the first electronic interconnect comprises a third electronic assembly;
    wherein the second electronic interconnect comprises a fourth electronic assembly; and
    wherein the third electronic assembly and the forth electronic assembly comprise power supplies and the computer backplane positions each power supply close to the first electronic assembly and the second electronic assembly to reduce distributions losses from either power supply to the first electronic assembly and the second electronic assembly.

9. The system of claim 8 further comprising at least a third electronic interconnect carried by the computer backplane and configured to operationally mate with at least a respective fifth electronic assembly, the at least third electronic interconnect comprises at least a sixth electronic assembly, and the fifth electronic assembly is carried by the circuit board.

10. The system of claim 8 wherein the computer backplane has a reduced profile due to the first electronic interconnect and the second electronic interconnect being distributed along the first electronic assembly and the second electronic assembly which mates to a system computer backplane.

11. The system of claim 10 wherein the reduced profile of the computer backplane increases the airflow around the first electronic assembly and the second electronic assembly the computer backplane mates to.

12. The system of claim 8 wherein the first electronic interconnect and the second electronic interconnect use mechanical tracks to align with the first electronic assembly and second electronic assembly respectively.

13. A system comprising:
a computer backplane;
a first electronic interconnect carried by the computer backplane configured to operationally mate with a first electronic assembly; and
a second electronic interconnect carried by the computer backplane that is physically separate from the first electronic interconnect to reduce the computer backplane's profile due to the first electronic interconnect and the second electronic interconnect being distributed along the first electronic assembly which mates the computer backplane and the reduced profile of the computer backplane increases the airflow around the first electronic assembly and a second electronic assembly the computer backplane mates to, and the second electronic interconnect configured to operationally mate with the second electronic assembly, and where the first electronic assembly and the second electronic assembly mate with the computer backplane at substantially a same time;
wherein a third electronic assembly and a forth electronic assembly comprise power supplies and the computer backplane positions each power supply close to a respective first and second electronic assembly to reduce distributions losses from either power supply to the first electronic assembly and the second electronic assembly.

14. The system of claim 13 wherein the first electronic interconnect and the second electronic interconnect are positioned on the computer backplane based upon the respective positions of the first electronic assembly and the second electronic assembly.

15. The system of claim 13 wherein the first electronic interconnect and the second electronic interconnect are in parallel and not in series.

\* \* \* \* \*